United States Patent [19]

Kajihara et al.

[11] Patent Number: 5,544,963
[45] Date of Patent: Aug. 13, 1996

[54] BEARING SEAL ASSEMBLY WITH SPECIALLY DIMENSIONED SEALING LIP

[75] Inventors: Kazuhisa Kajihara, Yao; Motoshi Kawamura; Kunio Yanai, both of Nara, all of Japan

[73] Assignee: Koyo Seiko Co., Ltd., Osaka, Japan

[21] Appl. No.: 290,306

[22] Filed: Aug. 12, 1994

[30] Foreign Application Priority Data

Nov. 19, 1993 [JP] Japan .................................. 5-290333
Apr. 22, 1994 [JP] Japan .................................. 6-084451

[51] Int. Cl.⁶ .............................. F16C 33/78; F16J 15/32
[52] U.S. Cl. ................................ 384/482; 384/486
[58] Field of Search ....................... 277/53, 152, 153, 277/168; 384/484, 486, 482

[56] References Cited

U.S. PATENT DOCUMENTS

| | | | |
|---|---|---|---|
| 3,275,331 | 9/1966 | Mastrobattista et al. | 277/152 |
| 3,494,681 | 2/1970 | Anderson et al. | |
| 3,870,384 | 3/1975 | Ladin . | |
| 4,166,628 | 9/1979 | Blaydon | 277/152 |
| 4,283,064 | 8/1981 | Staab et al. | 277/152 |
| 4,505,484 | 3/1985 | Ohkuma et al. . | |
| 4,519,616 | 5/1985 | Johnston | 277/152 |
| 4,533,265 | 8/1985 | Woodbridge . | |
| 4,643,594 | 2/1987 | Neder et al. . | |
| 4,645,215 | 2/1987 | Fuchs et al. | 277/152 |
| 4,854,749 | 8/1989 | Kohigashi et al. . | |
| 5,083,802 | 1/1992 | Shimasaki et al. | 277/152 |

Primary Examiner—Scott W. Cummings
Attorney, Agent, or Firm—Birch, Stewart, Kolasch & Birch, LLP

[57] ABSTRACT

A seal assembly interposed annularly between the inner and outer rings of a bearing assembly to seal an annular cavity formed between the inner and outer rings of the bearing assembly, the seal assembly having an annular seal member fitted onto the inner peripheral surface of the outer ring, a first annular seal lip, and a second annular seal lip, the first annular seal lip being in elastic-contact with the sidewall of an annular groove formed in the inner peripheral surface of the inner ring. The first annular seal lip has a radial length and an axial thickness satisfying a ratio (A/B) of the radial length (A) to the axial thickness (B), the ratio (A/B) being in the range of not less than 4.5 and not more than 7.0 to obtain a moderate rigidity capable of following the relative movement of the inner and outer rings. Communicating grooves are formed in the lower end portion of the first annular seal lip for communicating between the inside and outside of the bearing assembly, in order to prevent an increase in pressure within the bearing assembly because of a rise in temperature within the bearing assembly.

7 Claims, 10 Drawing Sheets ced 5,544,963

BEARING SEAL ASSEMBLY WITH SPECIALLY DIMENSIONED SEALING LIP

BACKGROUND OF THE INVENTION

1. Field of the Invention

The present invention relates to a seal assembly used for sealing an annular cavity formed between the inner and outer rings of a bearing assembly, and interposed between the inner and outer rings of a bearing assembly, and more particularly to a seal assembly having an annular seal member and an annular seal lip extending from the annular seal member and being in elastic-contact with the sidewall of an annular groove formed in the outer peripheral surface of the inner ring.

2. Description of the Related Art

With reference to FIG. 9, there is provided an idler bearing assembly 1, used in an engine for automobiles or the like, has a non-rotatable bearing ring or inner ring 2 in the form of a boss and a rotatable bearing ring or outer ring 4 arranged coaxially with the inner ring 2 at the axial end portion of the outer peripheral surface of the inner ring 2. On the outer peripheral surface of the outer ring 4 is engaged a timing belt, not shown.

The idler bearing assembly 1 also has a plurality of bearing balls 6, a crown type retainer 8 for retaining rollingly these balls 6 between the inner and outer rings 2, 4 of the bearing assembly 1, a seal assembly 10 interposed between the inner and outer rings 2, 4 for sealing grease within the bearing assembly 1, and a bracket 12 fixed on the outer peripheral surface of the axial end portion of the inner ring 2.

Referring to FIG. 10, the bearing assembly 1 is fitted to a fixed section (not shown) by a bolt inserted into a through hole 13 of the bracket 12. In case of making a tension adjustment to the timing belt 15 engaged onto the outer peripheral surface of the outer ring 4, the bearing assembly 1 is rotated about the through hole 12 in the clockwise or counterclockwise direction indicated by arrows.

Through the above-mentioned movement of the bearing assembly 1, the tension of the timing belt 15 is adjusted. That is, as the timing belt 15 is pushed by the outer ring 4 with the clockwise rotation of the bearing assembly, the tension thereof increases. Conversely, the tension of the timing belt 15 decreases with the counterclockwise rotation of the bearing assembly.

After the tension of the timing belt 15 is thus adjusted, the bearing assembly 1 is fixed by means of a bolt 19 inserted into a long hole 17 formed in the inner ring 2, such that the timing belt 15 is held in an adjusted tension state.

With particular reference to FIG. 11, the conventional seal assembly 10 used in the above bearing assembly 1, has an annular seal member 14 extending radially between the inner and outer rings 2, 4 of the bearing assembly 1, and two radially extending bifurcated annular seal lips, that is, a first seal lip 16 and a second seal lips 18. The first seal lip 16 extends radially downwardly from the lower end portion of the seal member 14. The second seal lip 18 extends radially obliquely from the lower end portion of the seal member 14 so as to be in an axially opposed relation to the first seal lip 16. The seal member 14 comprises an annular metal plate 20 and an annular elastic body 22 such as rubber bonded on the peripheral surface of the plate 20 and is fixed onto the shoulder portion 24 formed on the inner peripheral surface of the outer ring 4. An annular groove 26 is continuously formed circumferentially in the outer peripheral surface of the inner ring 2. Each of the first and second lips 16, 18 confronts the inside of the annular groove 26 having a nearly perpendicular sidewall 28 and a radially outward tapered sidewall 30.

The first seal lip 16 is in elastic-contact with the sidewall 30 of the annular groove 26 at the lower end thick portion thereof, while the second seal lip 18 is in non-contact with and close to the sidewall 28 of the groove 26 of the inner ring 2.

With the above construction, the behavior of the first seal lip 16 not having a moderate rigidity corresponding to the contact with the sidewall 30 of the groove 26 will be explained hereinbelow.

That is, when the relative position between the inner and outer rings 2, 4 is varied due to vibration or shock on the bearing assembly 1, since the first and second seal lips 16, 18 are so constructed as to move together with the movement of the outer ring 4, the relative position between the lips 16, 18 and the annular groove 26 of the inner ring 2 is also varied.

Such a variation may cause the contact state of the first seal lip 16 and the sidewall 30 of the groove 26 to become loose, resulting in that the sealing condition for sealing the grease within the bearing assembly deteriorates and hence the grease becomes leaky from between the first seal lip 16 and the sidewall 30.

For instance, for the first seal lip 16 of a high rigidity, it is difficult to follow the relative movement of the inner and outer rings 2, 4 so that the contact area between the first seal lip 16 and the sidewall 30 of the annular groove 26 is not varied. On the other hand, for the first annular seal lip 16 of a low rigidity, it is easy to follow the relative movement. In this case, however, the function for intercepting grease within the seal assembly 10 deteriorates. Accordingly, the first seal lip 16 not having a moderate rigidity gives a high possibility of the grease leakage, especially in using the bearing assembly having a rotatable outer ring.

In the seal assembly 10 having the above construction, since the inside of the bearing assembly is nearly shut off the outside thereof with the first seal lip 16 in contact with the sidewall 30 of the annular groove 26, the internal pressure of the bearing assembly will increase with a rise in an internal temperature thereof and cause the first seal lip 16 to float off the sidewall 30 or excessively to come off the bearing assembly.

In order to suppress the increase in the internal pressure of the bearing assembly, communicating grooves capable of communicating axially between the inside and outside of the bearing assembly may be formed at the lower end thick portion of the inner ring 2. In the seal assembly 10 having such communicating grooves, however, the grease within the annular groove 26 becomes leaky outside the seal assembly 10 through the communicating grooves by means of the action of a centrifugal force developed by the bearing assembly rotating.

SUMMARY OF THE INVENTION

In view of the foregoing, it is an object of the present invention to provide a seal assembly which will effectively prevent grease from leaking outside the bearing assembly even when the bearing assembly is vibrated or shocked.

Another object of the present invention is to provide a seal assembly which will effectively prevent an increase in pressure within a bearing assembly to prevent a grease leakage outside the bearing assembly when the seal assembly is mounted in the bearing assembly.

In order to achieve these objects, there is provided a seal assembly interposed between first and second bearing rings of a bearing assembly for sealing an annular cavity formed between the first and second bearing rings, the seal assembly comprising an annular seal member fitted onto the peripheral surface of the second bearing ring and extending toward the first bearing ring, and an annular seal lip extending from the annular seal member to the first bearing ring and being in elastic-contact with the sidewall of an annular groove formed in the peripheral surface of the first bearing ring, the annular seal lip having a radial length and an axial thickness satisfying a ratio (A/B) of the radial length (A) to the axial thickness (B), the ratio (A/B) being in the range of not less than 4.5 and not more than 7.0.

Preferably, the annular seal lip has a communicating groove formed axially in the inner peripheral surface thereof, the communicating groove functioning so as to communicate between the inside and outside of the bearing assembly with the communicating groove being inclined in the axial direction by means of the contact pressure applied from the sidewall of the annular groove.

According to the seal assembly having the annular seal lip, since the annular seal lip has the radial length and axial thickness satisfying the above ratio (A/B), the annular seal lip has a moderate rigidity capable of following smoothly the relative movement of the bearing rings of the bearing assembly. It follows that the contact state or seal interference between the annular seal lip and the sidewall of the annular groove sufficiently stabilizes even though the bearing assembly is vibrated or shocked during its rotation and the grease leakage from the inside of the bearing assembly can effectively be prevented.

Furthermore, in the case where the annular seal lip has the communicating groove on its inner peripheral surface, the communicating groove serves to prevent a rise in pressure within the bearing assembly by communicating between the inside and outside thereof. And, when the grease within the annular groove moves toward the outside of the bearing assembly, the bottom of the communicating groove inclines in an axial line and serves so as to return the grease to the inside of the bearing assembly. Consequently, in the seal assembly of the present invention, while a rise in pressure within the bearing assembly can effectively be prevented as described above, the grease leakage through the communicating groove outside the bearing assembly and the invasion of foreign objects from the outside thereof can effectively be prevented over a long period of time.

BRIEF DESCRIPTION OF THE DRAWINGS

The present invention will become more fully understood the detailed description given hereinbelow and the accompanying drawings which are given by way of illustration only, and thus are not limitative of the present invention, and wherein.

DETAILED DESCRIPTION OF THE PREFERRED EMBODIMENT

The present invention will now be described by way of examples, with reference to the accompanying drawings.

Figure 1:
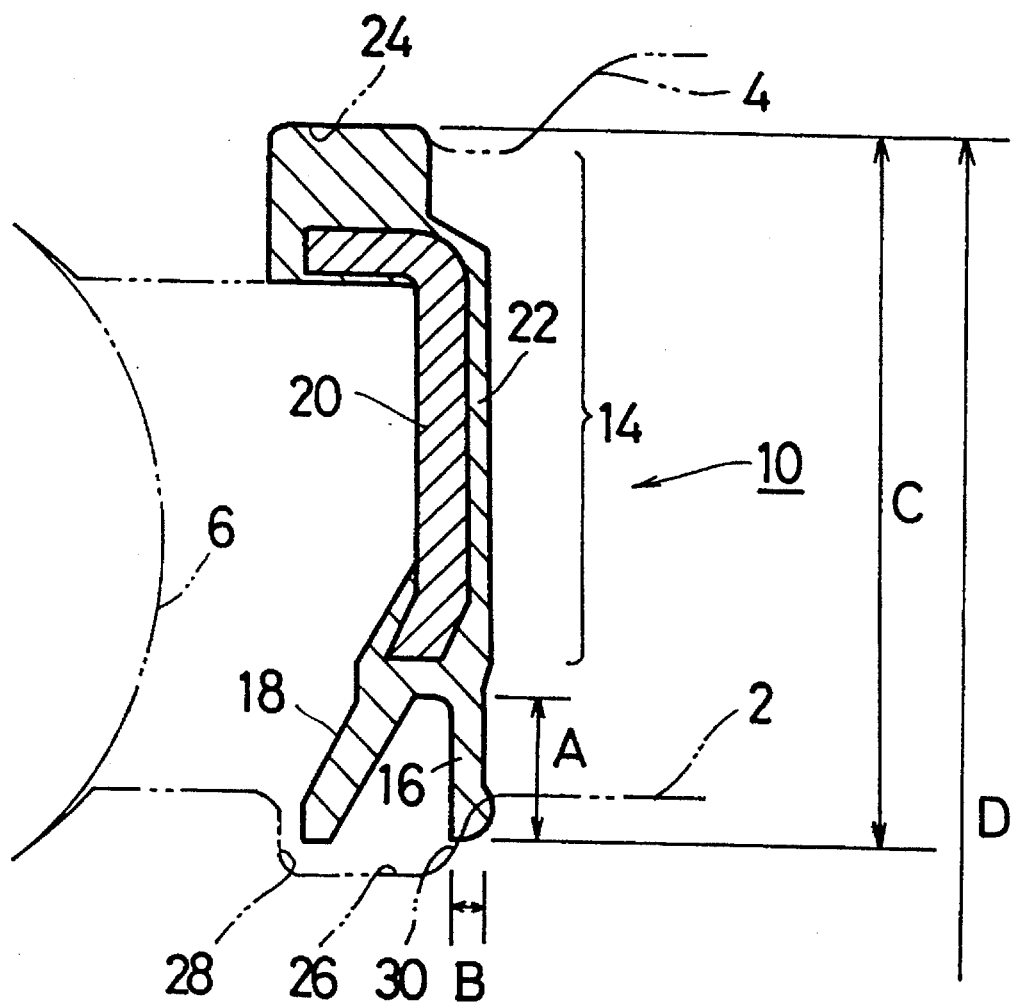
FIG. 1 is an enlarged longitudinal-sectional view of an upper portion of a seal assembly according to a first preferred embodiment of the present invention.
Figure 9:
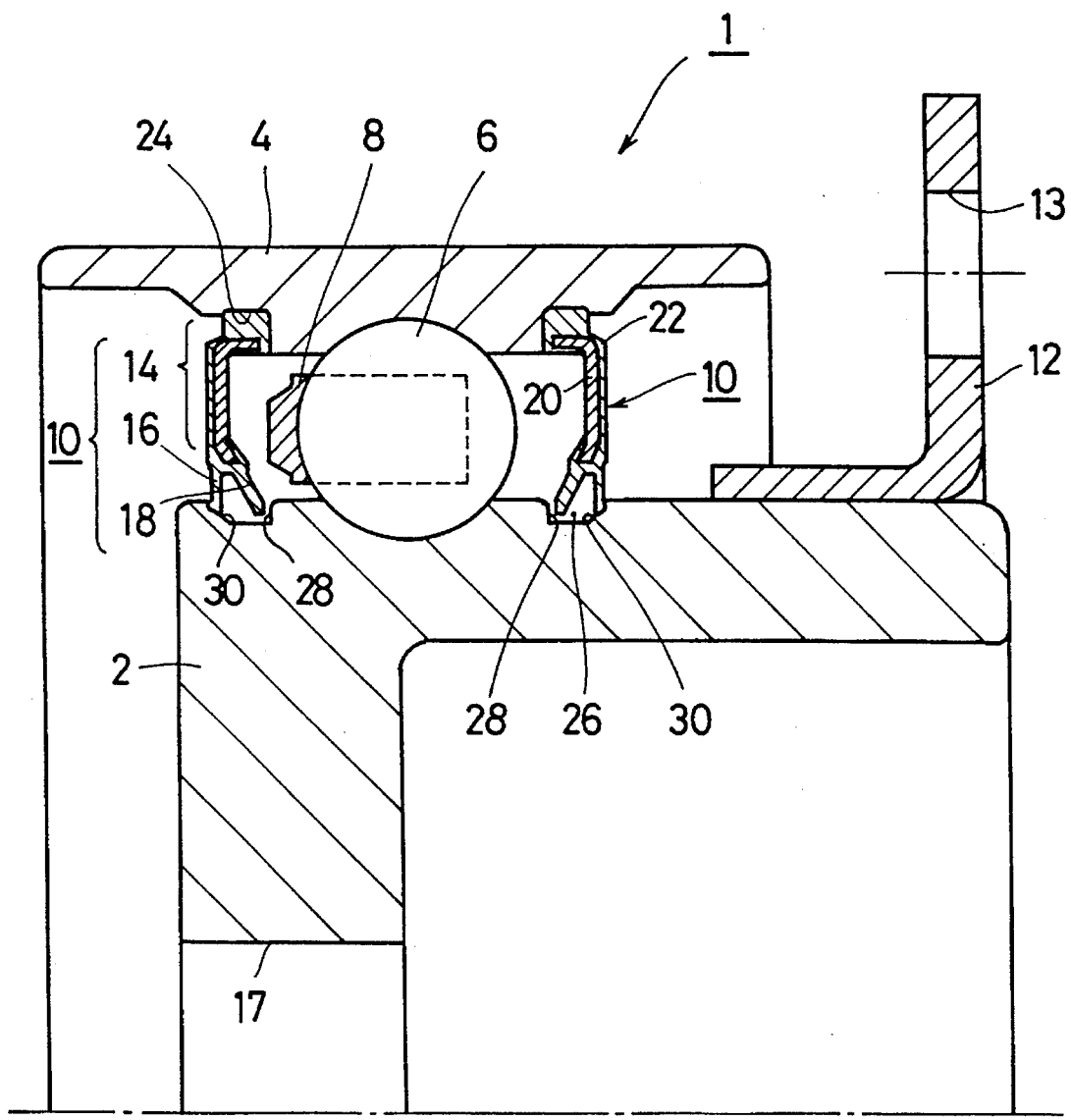
FIG. 9 is a longitudinal-sectional view of an upper portion of an idler bearing assembly in which a conventional seal assembly is assembled.
Figure 10:
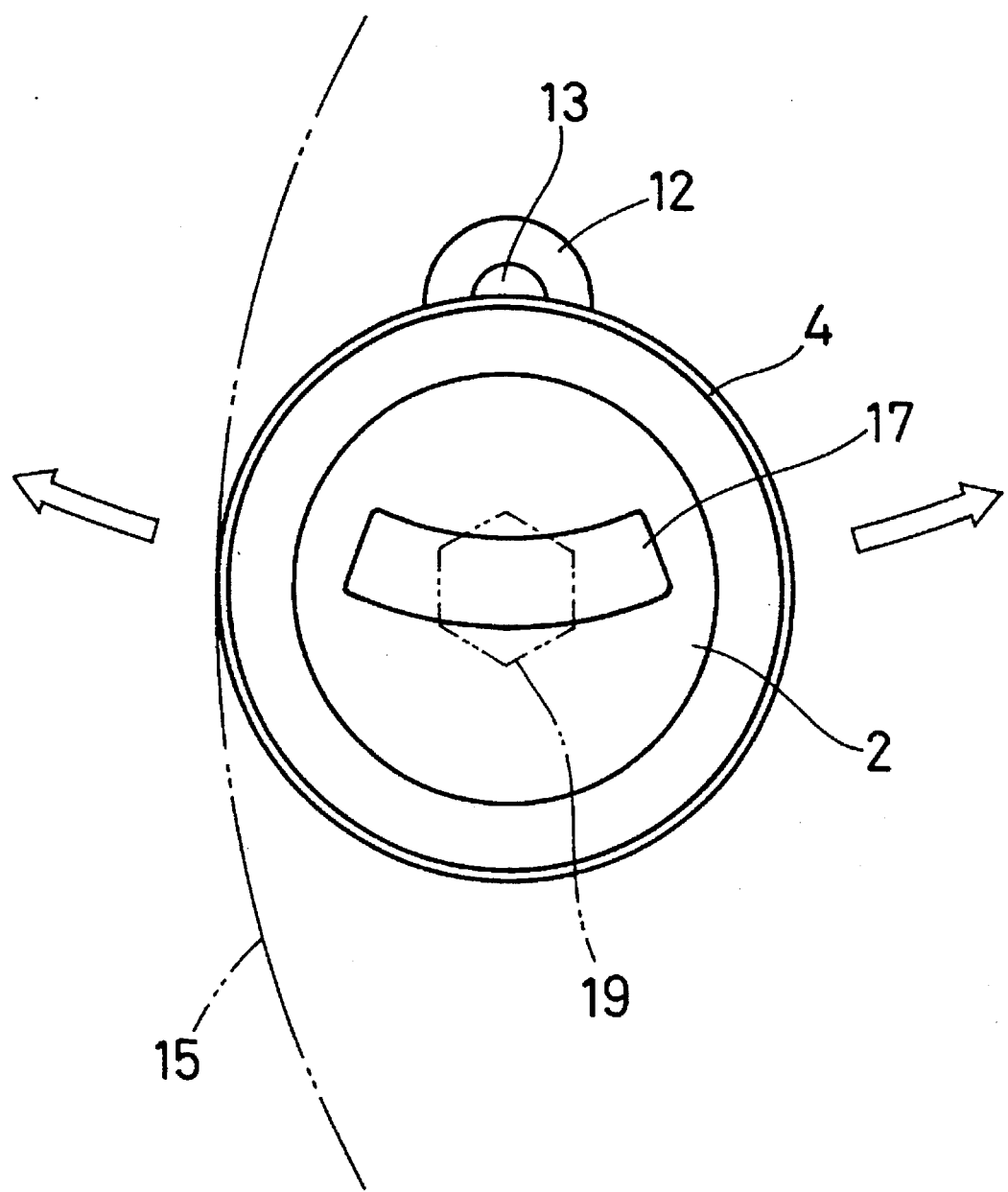
FIG. 10 is a reduced elevation view of the seal assembly shown in FIG. 9.
Figure 11:
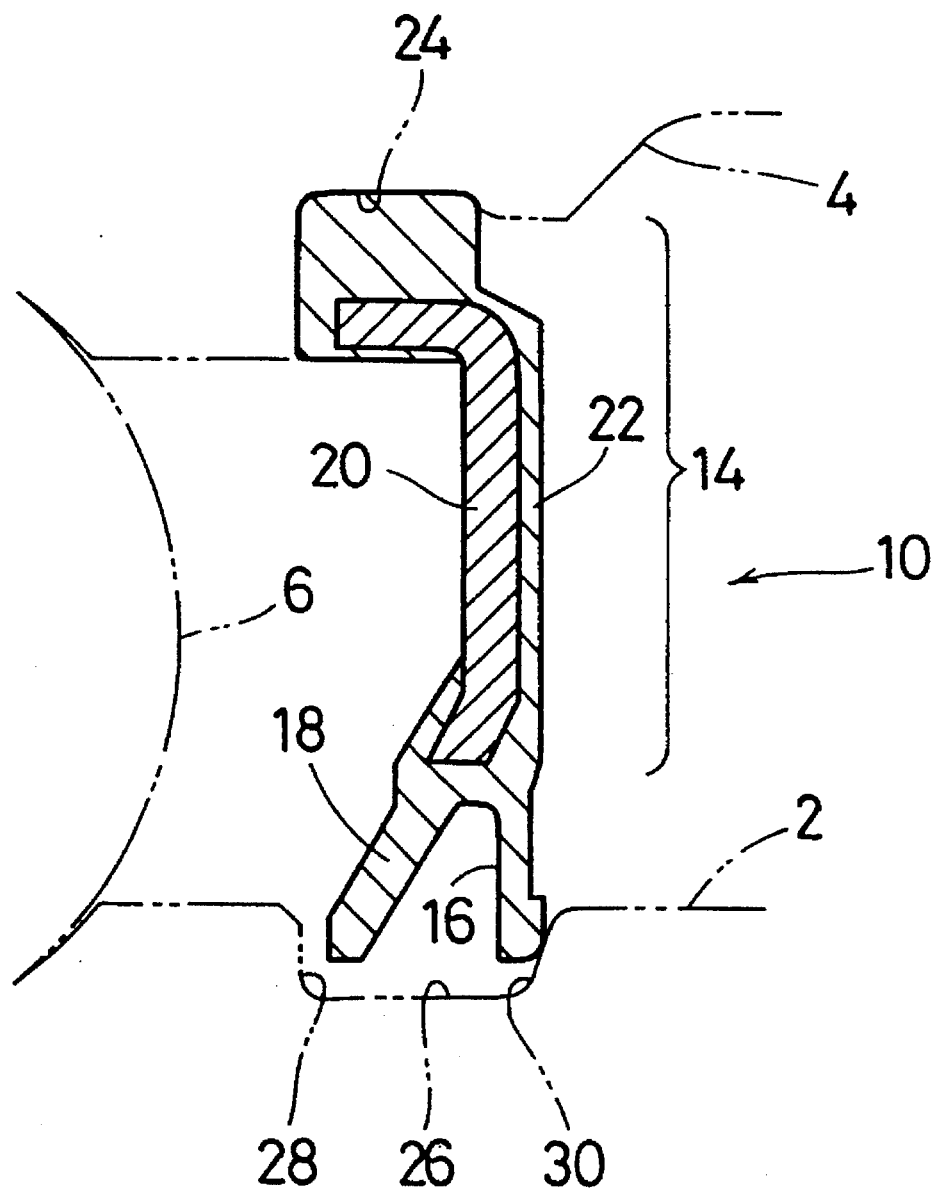
FIG. 11 is an enlarged longitudinal-view of an essential part of the seal assembly shown in FIG. 9.

FIG. 1 shows an enlarged longitudinal-sectional view of an essential part of a seal assembly according to a first preferred embodiment of the present invention, wherein like reference numerals designate like or corresponding parts in FIGS. 9 to 11.

With reference to FIG. 1, there is provided a seal assembly 10 mounted in a bearing assembly having a non-rotatable bearing ring or inner ring 2 and a rotatable bearing ring or outer ring 4, the seal assembly 10 being interposed between the inner ring 2 and the outer ring 4 and comprising an annular seal member 14 and two bifurcated annular seal lips, that is, a first annular seal lip 16 and a second annular seal lip 18.

The annular seal member 14 is fitted onto a shoulder portion 24 formed on the inner peripheral surface of the outer ring 4 and is extended radially toward the outer peripheral surface of the inner ring 2. The annular seal member 14 comprises an annular metal plate 20 such as a steel plate and an annular elastic body 22 such as rubber bonded on the peripheral surface of the metal plate 20. An annular groove 26 is formed in the outer peripheral surface of the inner ring 2, having a nearly perpendicular sidewall 28 and an axially outward tapered sidewall 30. The seal lips 16, 18 are each extended radially inwardly from the lower end portion of the annular elastic body 22 so that they confront the annular groove 26 to form a sealing section together with the outer peripheral surface of the inner ring 2. The first annular seal lip 16 is in elastic-contact with the tapered sidewall 30 of the annular groove 26 of the inner ring 2 at the lower end thick portion thereof, while the second annular seal lip 18 is in non-contact with and close to the perpendicular sidewall 28 of the annular groove 26 of the inner ring 2.

In the seal assembly 10 of the first preferred embodiment of the present invention, the first annular seal lip 16 has a radial length and an axial thickness satisfying a ratio (A/B) of the radial length (A) to the axial thickness (B), the ratio (A/B) being in the range of not less than 4.5 and not more than 7.0, where the rigidity of the first annular seal lip 16 increases as the ratio (A/B) becomes small, decreasing as the ratio (A/B) becomes large.

The ratio (A/B) is determined on the basis of the results for the following test for checking the grease leakage from the bearing assembly which is being vibrated or shocked during its rotation.

The conditions of the bearing assembly and seal assembly used for the grease leakage test are as follows. Regarding the bearing assembly, its bearing number is JIS (Japanese Industrial Standard) 6007, its retainer is made of a reinforced nylon or polyamide resin, its basic load rating C is 1250 kg (old JIS), its basic static load rating $C_0$ is 915 kg (old JIS), and its sealing grease is urea resin. Regarding the seal assembly 10, its elastic body 22 is made of a fluoro rubber, its outer diameter D is 62 mm φ, and its radial length from the upper end to the lower end of the first annular seal lip 16 is 7.1 mm.

Further, the seal assemblies of plural kinds from N1 to N11 are used for the test, in which the ratio (A/B) is variously selected, with the proviso that the ratio (A/B) of each of the seal assemblies from N1 to N7 is included in the range of not less than 4.5 and not more than 7.0, while on the other hand, the ratio (A/B) of each of the seal assemblies from N8 to N11 is not included in the range.

Figure 2:
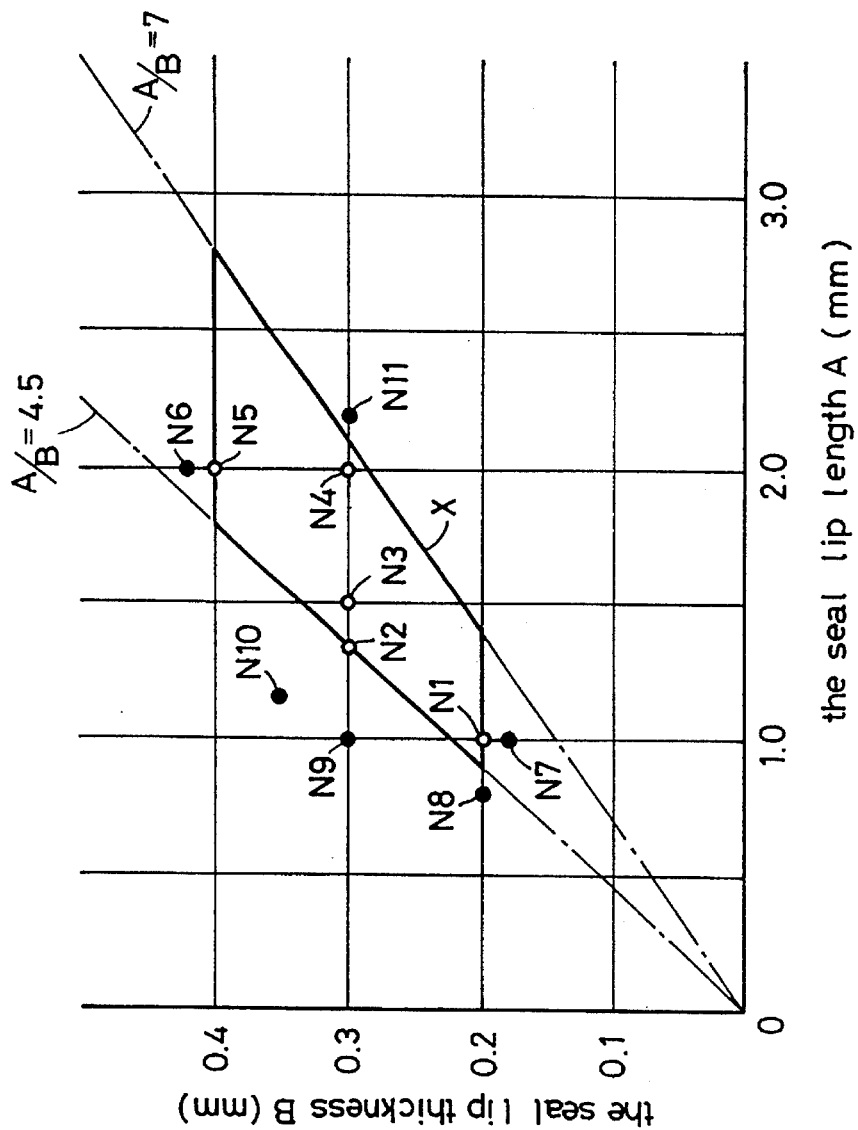
FIG. 2 is a graph showing the results of a grease leakage test of a bearing assembly in which the seal assembly is assembled.

The result of the test, as shown in FIG. 2, proves that the seal assemblies from N1 to N5 show no grease leakage, but those from N6 to N11 show grease leakage. In accordance with the result, to obtain the seal assemblies causing no grease leakage, the ratio (A/B) is determined to be 4.5 as its lowest limit and to be 7.0 as its highest limit, respectively. However, since the seal assemblies N6 and N7 having the ratio (A/B) of not less than 4.5 and not more than 7.0 show the grease leakage, it is clear that the rigidity of the first annular seal lip 16 is excessively low in case of the axial thickness (B) of less than 0.2 mm and excessively high in case of the axial thickness (B) of more than 0.4 mm. For this reason, it is preferable that the axial thickness (B) be limited within the range of not less than 0.2 mm and not more than 0.4 mm on the seal assemblies used in the test. Accordingly, most preferably, as specified in the range encircled with a thick solid line X in FIG. 2, the axial thickness (B), in addition to the ratio (A/B), is specified in order to prevent the grease leakage effectively.

Further, though the seal 1 assembly 10 in the first embodiment of the present invention is fixed to the outer ring 4 of the bearing assembly, it may be fixed to the inner ring 2 of the bearing assembly.

In the seal assembly 10 according to the first embodiment, by determining the ratio (A/B) of the first annular seal lip 16, the first annular lip 16 can have a moderate rigidity capable of following smoothly the relative movement of the inner and outer rings 2, 4 of the bearing assembly, so that the contact state, or seal interference, between the first annular seal lip 16 and the sidewall 30 of the annular groove 26 is stabilized so as to prevent effectively the grease leakage even when the bearing assembly is vibrated or shocked.

Figure 3:
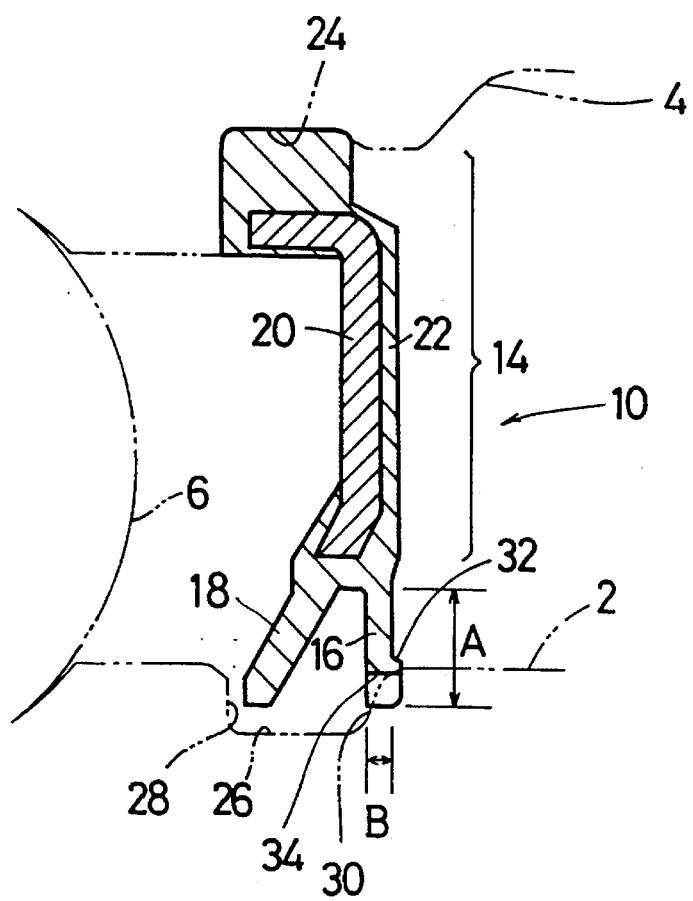
FIG. 3 is an enlarged longitudinal-sectional view of an upper portion of the seal assembly according to a second preferred embodiment of the present invention.
Figure 4:
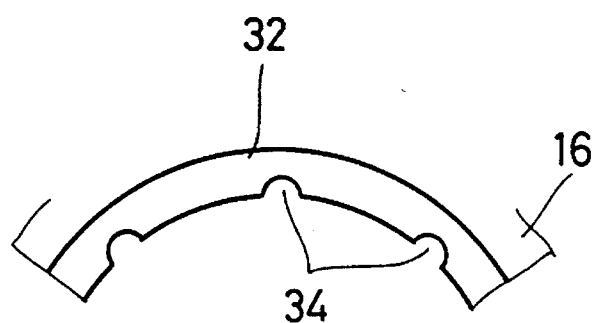
FIG. 4 is in enlarged elevation view of an annular seal lip of the seal assembly shown in FIG. 3.
Figure 5:
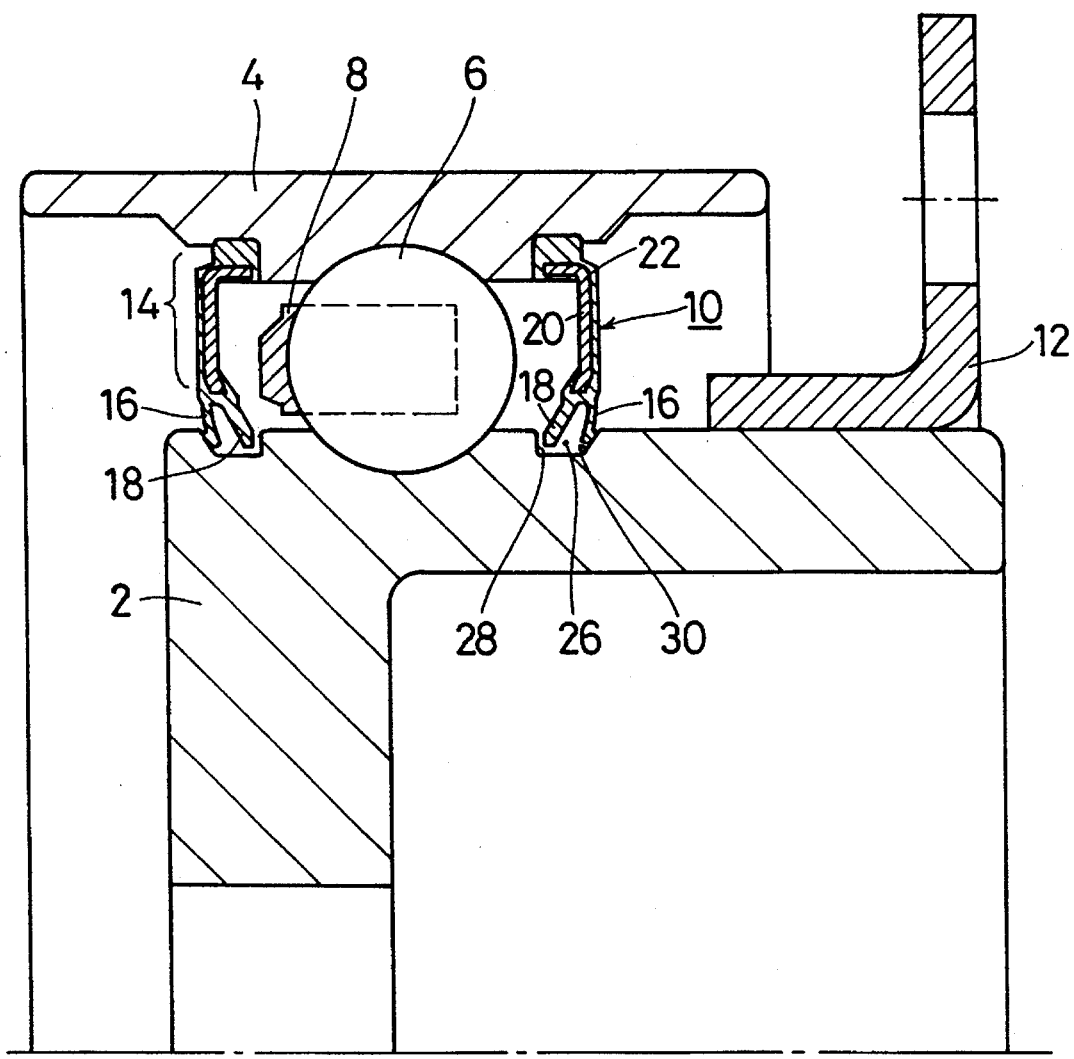
FIG. 5 is an enlarged longitudinal-sectional view of an upper portion of the bearing assembly in which the seal assembly is assembled.
Figure 6:
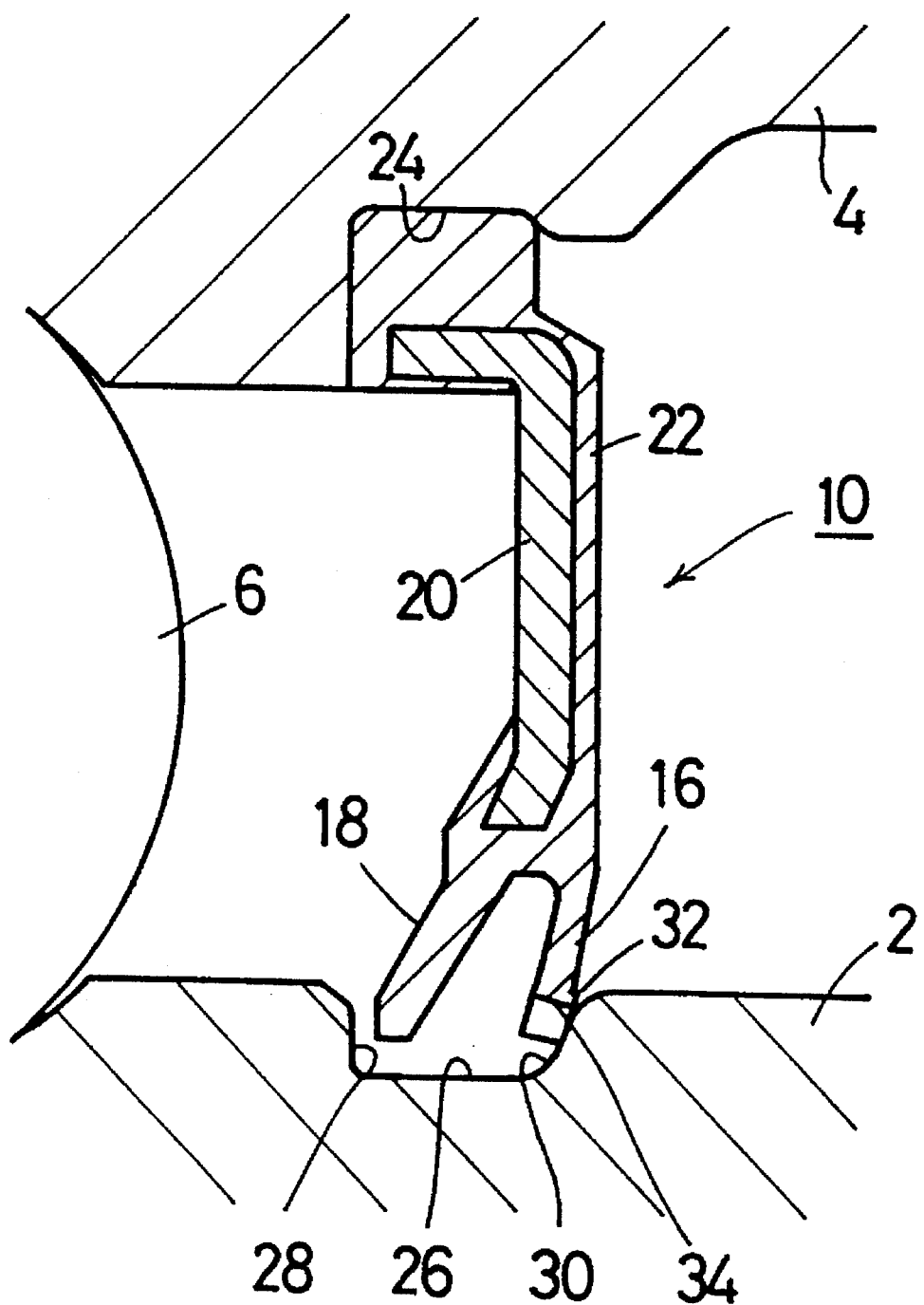
FIG. 6 is an enlarged view of an essential part of the seal assembly shown in FIG. 3, assembled in the bearing assembly.
Figure 7:
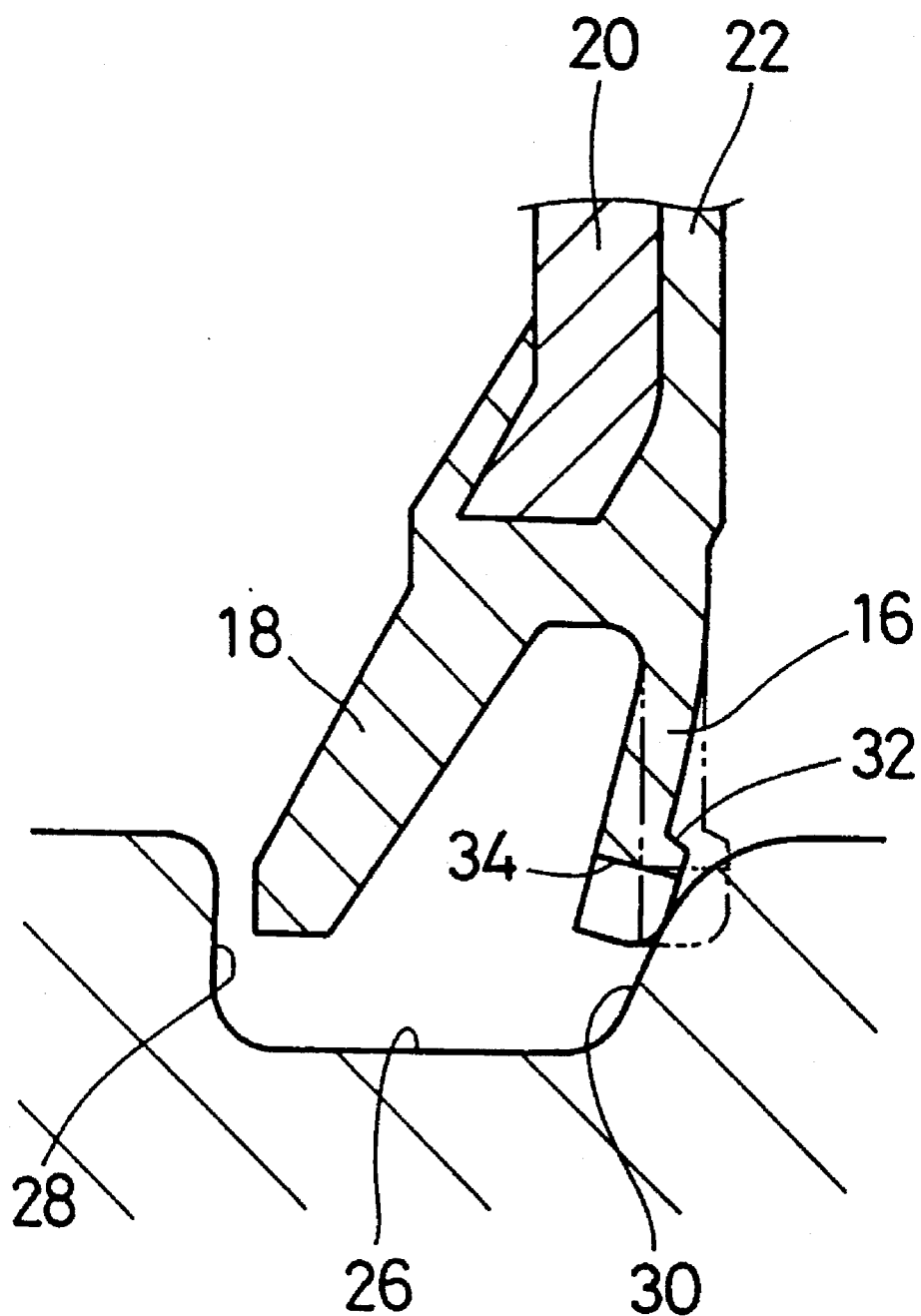
FIG. 7 is a further enlarged view of a lower end portion of the annular seal lip shown in FIG. 6.

Referring to FIGS. 3 through 7, there is provided a seal assembly 10 according to a second preferred embodiment of the present invention, which has the same basic construction as the seal assembly 10 of the first embodiment. In the seal assembly 10 of the second embodiment, the first annular seal lip 16 has a thick portion 32 on the outer peripheral surface. A plurality of communicating grooves 34 are formed at circumferential points in the lower end face of the thick portion 32 of the first annular seal lip 16. Each communicating groove 34 has a nearly semicircular form in axial cross-section, as seen in FIG. 4, for communicating between the inside and outside of the bearing assembly. When the first annular seal lip 16 is inclined from the non-contact state with the annular groove 26 as shown in FIG. 3 to the contact state with the sidewall 30 of the annular groove 26 as shown in FIG. 6, the bottoms of the communicating grooves 34 are pushed and inclined by the sidewall 30 of the groove 26 so as to communicate between the inside and outside of the bearing assembly. After all, in the contact state between the first annular seal lip 16 and the sidewall 30 of the annular groove 26 as shown in FIG. 6, the communicating grooves 34 constitute air holes permitting a constant communication between the inside and outside of the bearing assembly 1. Further, in the present invention, the communicating grooves 34 may be at least one in number and modified in number and sectional forms.

In operation, the second seal lip 18 does not have seal resistance during rotation of the bearing assembly because it is in non-contact with the sidewall 28 of the annular groove 26. However, the clearance, called labyrinth clearance, between the second seal lip 18 and the sidewall 28 is minute, so that the grease leakage through the clearance to the outside of the bearing assembly 1 is limited to a small amount. The grease near the inner ring 2 of the bearing assembly 1 is fed toward the outer ring 4 through the inside inclined surface of the second annular seal lip 18 by a centrifugal force developed by the rotation of the bearing assembly 1. Hence the grease is effectively circulated within the bearing assembly 1 and does not move easily toward the labyrinth clearance.

On the other hand, since the thick portion 32 of the first annular seal lip 16 is in close-contact with the sidewall 30 of the annular groove 26, the grease leakage and the invasion of foreign materials from the outside are prevented. Since the communicating grooves 34 of the first annular seal lip 16 form the air holes communicating constantly between the inside and outside of the bearing assembly 1, the pressure within the bearing assembly rotating at a high rate can be reduced.

Furthermore, though the grease leakage through the grooves 34 during the rotation of the bearing assembly 1 is generated only a minute amount, the amount of the grease leakage is less as compared with the conventional way. This has been proved from the grease leakage test conducted while the bearing assembly 1 is being vibrated with the seal assembly 10 being mounted therein.

Regarding the bearing assembly using the above test, its bearing number is JIS6007, its retainer is made of reinforced nylon resin, used grease is urea resin, its radial clearance between the grooves 34 and the sidewall 30 of the groove 26 is within the range of not less than 7 μm and not more than 17 μm, and the amount of grease sticking to the annular groove 28 is 0.1 g. The rotation number of the bearing assembly is 7,000 r.p.m., the test time is three hours, and the load applied to the bearing assembly is 980 N (100 kgf). As a result, the amount of grease leakage is 0g in the seal assembly of the second embodiment of the present invention and 0.03 g in the conventional construction.

Accordingly, in the seal assembly of the present invention, it is considered that since the first annular seal lip 16 inclines the communicating grooves 34, the grease being about to leak is returned into the bearing assembly, resulting in the reduction in the grease leakage.

Further, although the bearing assembly used for the test was left in a high temperature chamber of an atmosphere temperature of 150° C. for six hours, the seal assembly mounted therein did not float off or come off the bearing assembly.

The communicating grooves 34 of the seal assembly 10 of the present invention can, therefore, serve to prevent a rise in an internal pressure of the bearing assembly.

Consequently, the bearing assembly of the present invention can effectively prevent an increase in the internal pressure within the bearing assembly, and at the same time can effectively prevent the grease leakage outside the bearing assembly through the groove 34 and invasion of foreign materials from the outside thereof over a long time.

Figure 8:
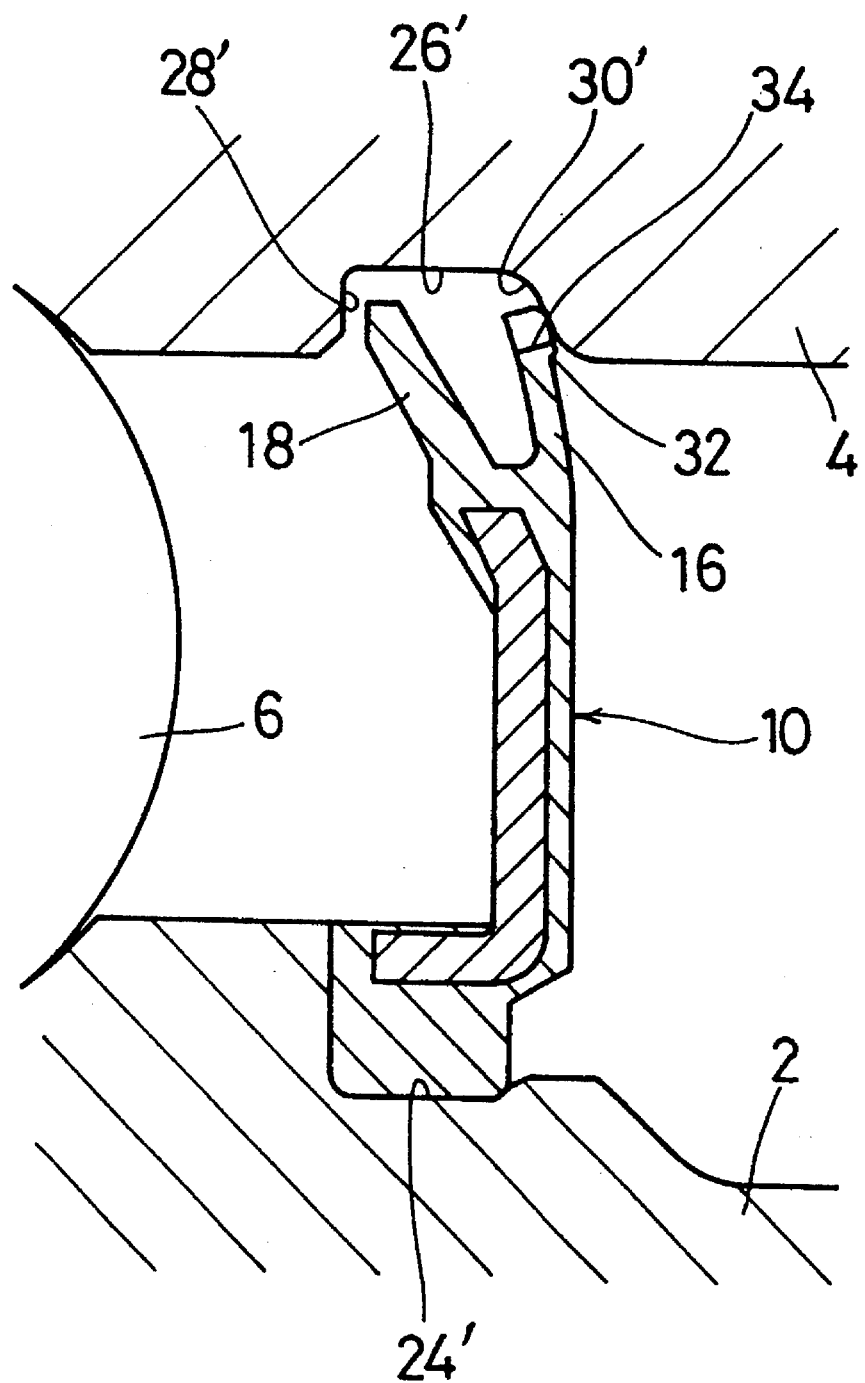
FIG. 8 is an enlarged longitudinal-sectional view of an essential part of a seal assembly according to a third preferred embodiment of the present invention.

FIG. 8 shows a seal assembly according to a third preferred embodiment of the present invention. In the third embodiment, on the inner peripheral surface of the inner ring 2 is formed a shoulder portion 24' corresponding to the shoulder portion 24 and an annular groove 26' corresponding to the annular groove 26, respectively.

The annular groove 26' has sidewalls 28', 30' each corresponding to each of the sidewalls 28, 30 of the annular groove 26. In the inner and outer rings 2, 4 having the above construction, the seal assembly 10 is fixed onto the shoulder portion 24' of the inner ring 2, whose annular seal lips 16, 18 form a sealing section at the outer ring 4 with confronting the annular groove 26' (the sidewalls 28', 30').

In this case, the communicating grooves 34 in the third embodiment can serve to return the grease back into the bearing assembly by a centrifugal force developed by the rotation of the bearing assembly and achieve the same effect as the second embodiment.

It will be appreciated that the seal assembly of the present invention may be mounted in various kinds of bearing assemblies as well as an idler bearing assembly. Further, in the seal assembly 10 according to the second and third embodiments of the present invention, assuming that the first annular lip 16 of the seal assembly 10 does not have communicating grooves 34, it is preferable to determine the ratio (A/B) of the radial length (A) to the axial thickness (B) in the same manner as the seal assembly of the first embodiment. The communicating grooves 34 of the first annular seal lip 16 are formed in consideration of the ratio (A/B) in order to prevent the grease leakage.

Similarly to the first embodiment, in the seal assembly 10 of the second and third embodiments, the ratio (A/B) of the radial length (A) and the axial thickness (B) of the annular seal lip 16 is selected to obtain a moderate rigidity and a performance capable of following the relative movement of the inner and outer rings of the bearing assembly. With such a moderate selection of the ratio (A/B), the contact state between the wallside of the annular groove of the inner ring and the annular seal lip is stabilized and then the grease leakage from the bearing assembly can effectively be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seal assembly for sealing an annular cavity formed between a first bearing ring and a second bearing ring disposed coaxially with the first bearing ring, and interposed annularly between the first bearing ring and the second bearing ring, said seal assembly comprising:

an annular seal member fitted onto the peripheral surface of said second bearing ring and extending toward said first bearing ring; and an annular seal lip extending from said annular seal member to said first bearing ring and being in elastic-contact with a sidewall of an annular groove formed in the peripheral surface of said first bearing ring, said annular seal lip having a radial length and an axial thickness each satisfying a ratio (A/B) of said radial length (A) to said axial thickness (B), said ratio (A/B) being in the range of not less than 4.5 and not more than 7.0, and having an axial thickness being in the range of not less than 0.2 mm and not more than 0.4 mm.

2. The seal assembly according to claim 1, wherein said annular seal member includes an annular metal plate and an annular elastic body, said annular elastic body being bonded to said annular metal plate and fixed at one end thereof on the peripheral surface of said second bearing ring.

3. The seal assembly according to claim 2, wherein said annular seal lip is formed by extending the other end of said annular elastic body toward the peripheral surface of said first bearing ring.

4. The seal assembly according to claim 1, wherein said annular seal lip has an axial communicating groove in the inner peripheral surface thereof, said axial communicating groove functioning to communicate between the inside and outside of said bearing assembly with said annular seal lip being pushed and inclined by a contact with said sidewall of said annular groove.

5. A bearing assembly comprising:

a first bearing ring having an annular groove in the peripheral surface;

a second bearing ring interposed coaxially with said first bearing ring;

a seal assembly for sealing an annular cavity between said first and second bearing rings, and interposed between said first and second bearing rings, said seal assembly having an annular seal member fitted onto the peripheral surface of said second bearing ring and extended toward said first bearing ring, and an annular seal lip extending from said annular seal member to said first bearing ring and being in elastic-contact with said sidewall of said annular groove, said annular seal lip having a radial length and an axial thickness each satisfying a ratio (A/B) of said radial length (A) to said axial thickness (B), said ratio (A/B) being in the range of not less than 4.5 and not more than 7.0, and having an axial thickness being in the range of not less than 0.2 mm and not more than 0.4 mm.

6. The bearing assembly according to claim 5, wherein said annular seal lip has an axial communicating groove in the inner peripheral surface thereof, said axial communicating groove functioning to communicate between the inside and outside of said bearing assembly with said annular seal lip being pushed and inclined by a contact with said sidewall of said annular groove.

7. The bearing assembly according to claim 6, wherein said sidewall of said annular groove is tapered axially outwardly.

* * * * *